Sept. 12, 1967  E. F. WELTI  3,340,547
SEAT BED

Filed Oct. 22, 1965  2 Sheets-Sheet 1

INVENTOR.
EUGENE F. WELTI
BY
Marechal, Biebel, French & Bugg
ATTORNEYS

Sept. 12, 1967  E. F. WELTI  3,340,547
SEAT BED
Filed Oct. 22, 1965  2 Sheets-Sheet 2
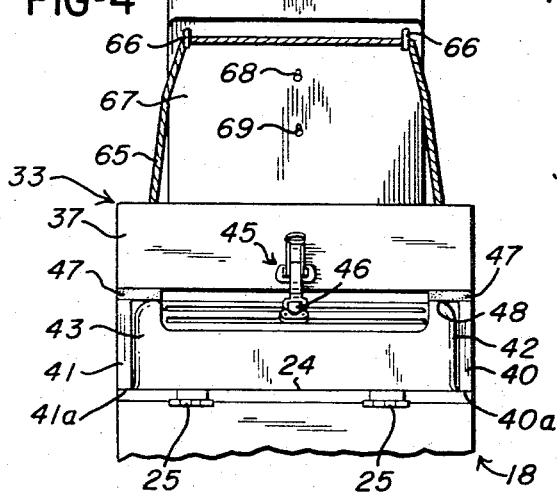
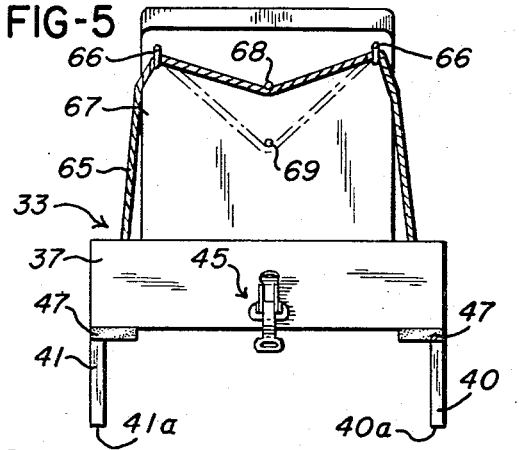
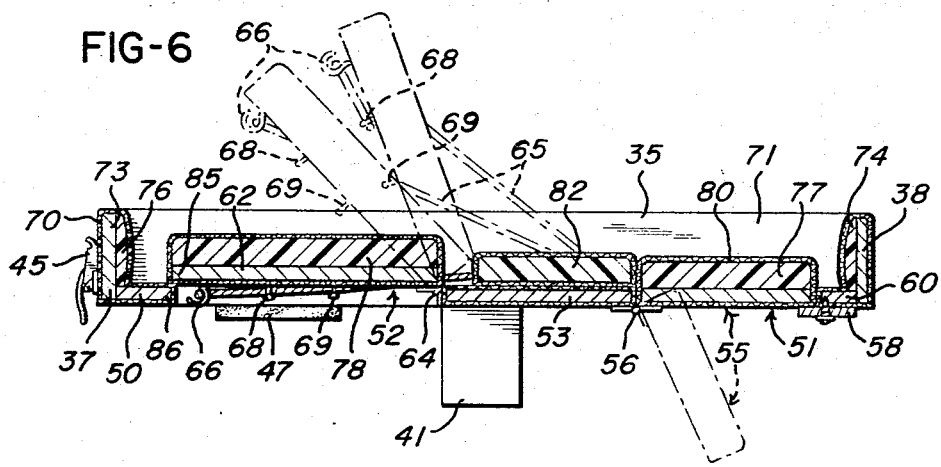

United States Patent Office 3,340,547
Patented Sept. 12, 1967

3,340,547
SEAT BED
Eugene F. Welti, 735 N. Summit St.,
Dayton, Ohio 45407
Filed Oct. 22, 1965, Ser. No. 501,343
6 Claims. (Cl. 5—118)

ABSTRACT OF THE DISCLOSURE

A combined seat and bed unit adapted to be removably mounted on the motor housing of a station bus. The unit has an upstanding flange around the elongated periphery thereof and a bottom surface which folds from a flat position into a chair position so that a child can either sleep or sit up.

---

This invention relates to an auxiliary device adapted to increase the useful space in a vehicle, and particularly to a convertible seat bed for use in a station bus.

More specifically, this invention is adapted for use with the multi-purpose station buses of the type presently being manufactured for use as delivery vans, utility trucks, and as passenger vehicles. One example of such a vehicle is sold under the trademark "Econoline" by the Ford Motor Company of Detroit, Mich. These station buses make maximum use of the space consumed by the vehicle since the useful space in the interior thereof covers the entire chassis, rather than having the usual separate motor and trunk compartment. In such a vehicle, the motor is generally disposed between the driver's seat and the front passenger seat and the entrance to the motor is gained by removing a top cover from the motor housing. Thus the driver and the passenger in the front seat ride directly above the front wheels and the rear portion of the vehicle includes additional seats, storage space, or a working area.

An important object of this invention is to provide an auxiliary device adapted for mounting above the motor housing of a station bus to use the heretofore wasted space above such housing, and particularly to provide a device of the aforesaid type which can be easily and quickly removed as required to allow easy entry into the motor housing to service the motor.

Another object of this invention is to provide an auxiliary seat bed adapted for mounting on the top surface of the motor housing between the front seats of a station bus, and further to provide a seat bed of this type which is easily and quickly converted between a flat surface wherein a child may sleep or a chair wherein a child may sit in an upright position.

A further object is to provide a seat bed of the aforesaid type which is relatively simple in design and therefore inexpensively manufactured, and more particularly to provide a seat which is adjustable so that the child may recline or sit in an upright position and which has support legs adapted to be accommodated by substantially any motor housing utilized in a station bus.

Other objects and advantages of the invention will be apparent from the following description, the accompanying drawings and the appended claims.

In the drawings:

FIG. 4 is a rear view of the seat bed mounted on the motor housing;

FIG. 5 is a view similar to FIG. 4 but showing the seat in an alternate position; and FIG. 6 is a sectional view along the lines 6—6 of FIG. 3 showing the alternate positions of the seat bed.

Figure 1:
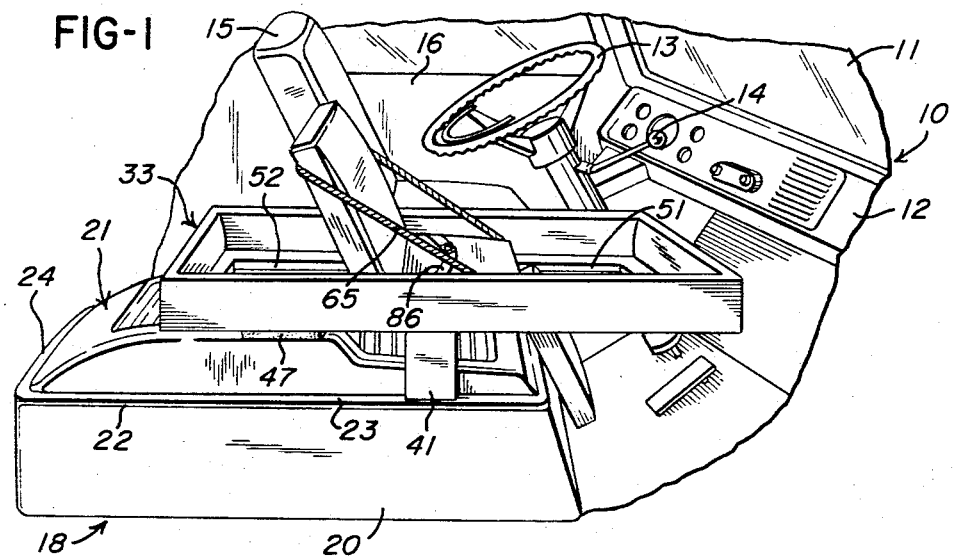
FIG. 1 is a perspective view showing the auxiliary seat bed mounted in a station bus in accordance with the invention.

Referring to the drawings wherein a preferred embodiment of the invention is shown, FIG. 1 illustrates a station bus 10 of the type described above which includes a front windshield 11 having a dashboard 12 at the lower edge thereof. The steering wheel 13 and gear shift lever 14 are provided in the usual manner in front of the driver's seat 15 which is adjacent the side door 16 of the vehicle. The motor housing 18 encloses the internal combustion engine which drives the vehicle, and this motor housing is located between the driver's seat 15 and the substantially identical passenger's seat (not shown) on the opposite side of the motor housing 18.

Figure 2:
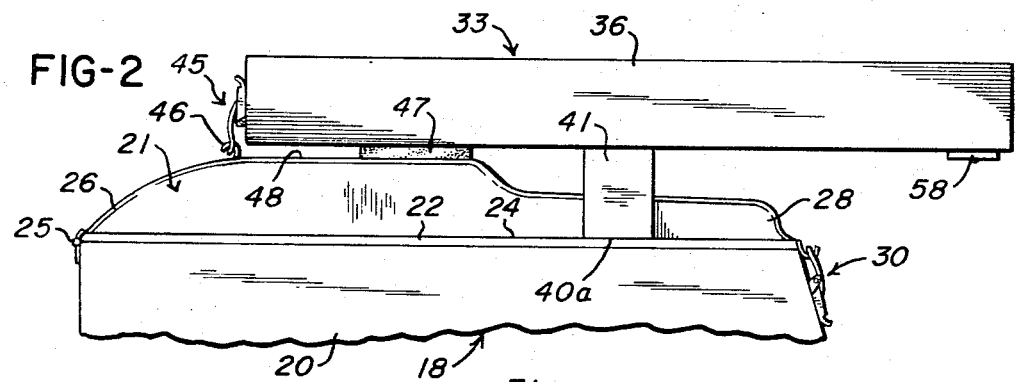
FIG. 2 is a side elevational view of the seat bed mounted on a motor housing.
Figure 3:
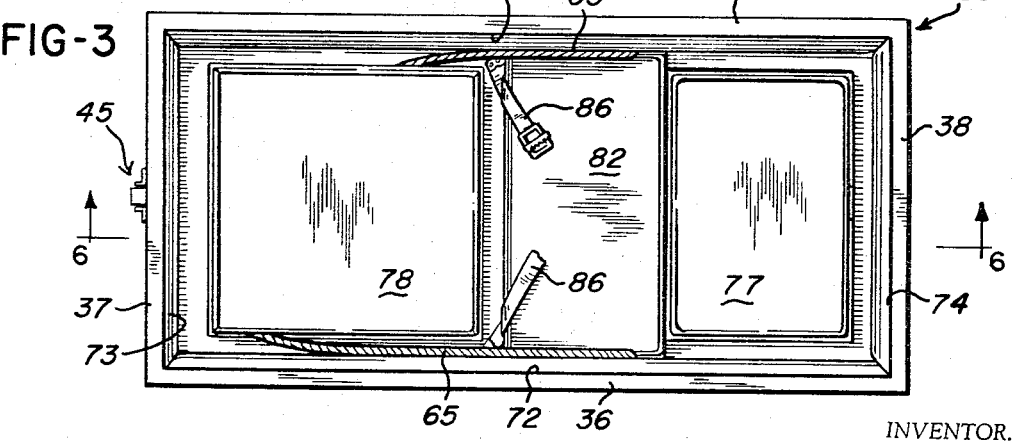
FIG. 3 is a plan view of the seat bed.

The motor housing 18 includes a lower portion 20 which surrounds the major portion of the engine and has a cover 21 mounted on the top thereof. The periphery of the upper edge 22 of the lower portion 20 is slightly larger than the main section of the cover 21 so that the horizontal flange 24 extends around the periphery of the cover 21 and engages the upper edge 23 to close the housing 18. As shown in FIG. 2, the cover 21 is pivotally connected by the hinge 25 at its rear end 26 to the lower portion 20 of the housing. The front end 28 thereof has an adjustable overcenter clamp 30 which is utilized to lock the cover 21 to the lower portion 20 and this clamp can be released so that the cover 21 will pivot in a counterclockwise direction to expose the engine for usual maintenance.

The auxiliary seat bed 33 which is the subject of this invention includes a rectangular frame having elongated side walls 35 and 36 with the vertically extending rear and front walls 37 and 38 secured rigidly thereto. The distance between the side walls 35 and 36 is substantially equal to the width of the motor housing 18, and the support legs 40 and 41 extend downwardly from the central portion of the side walls 35 and 36 to engage the rest on the horizontal flange 24 on opposite sides of the cover 21. The support legs are accordingly spaced apart the distance slightly greater than the side walls 42 and 43 of the cover 21 so that they are aligned easily on the flange 24, as seen in FIG. 4. These legs may be formed integrally with the side walls 35 and 36, and they have flat horizontal surfaces 40a and 41a on the lower edge thereof so that they contact the flange 24 on the entire width of the legs.

The rear portion of the seat bed 33 is locked in place by the reasonable overcenter clamp 45 mounted on the rear wall to engage the hook member 46 on the cover 21. When this clamp is engaged, it depresses the resilient pads 47 between the rear portions of the side walls 36 and 37 and the top surface 48 of the cover 21 so that the entire seat bed 33 is held in place against movement. The seat bed can easily be separated from the cover 21 by releasing and detaching the clamp 45 and raising the entire frame upwardly from the cover 21.

The bottom wall 50 is provided in the frame secured to each of the walls 35–38 to form a flat surface except for the front and rear openings 51 and 52 (FIGS. 1 and 6) which are separated by a central section 53 of the bottom wall 50. The front opening 51 is adjacent the front wall 38 of the seat bed and this opening is normally closed by the leg panel 55 which is pivotally connected to the central section 53 of the bottom wall 50 by the hinges 56. The leg panel 55 will pivot upwardly into the plane of the bottom wall 50 wherein it can be held by the block 58 mounted on the forward portion 60 of the bottom wall 50 and is adapted to be rotated to and from a position beneath the leg panel 55, as shown in FIG. 6.

The rear opening 52 may be closed by a back panel 62 which is mounted slightly above the plane of the bottom wall 50 and is pivotable upwardly about the hinges 64 to form the back of a seat. The back panel 62 is held in an upright position by the flexible cord 65 or its equivalent which extends from connections to the side walls 35 and 36 adjacent the forward end of the central section 53 upwardly and through the pair of loops 66 on the rear side 67 of the back panel 62. The cord 65 can then be looped downwardly around either of the adjustment members 68 or 69 to hold the back panel 62 in a more upright position, as shown in FIG. 6. Thus, when the cord 65 is moved from the position shown in the solid lines in FIG. 5 to the position under the member 69 shown in the broken lines, the seat is almost upright.

The entire seat bed may be constructed of wood, plastic, metal materials, or combinations thereof, and each of the walls 35–38 and 50 is covered by a suitable plastic material 70 which enhances the durability and appearance thereof. The inside surfaces 71–74 of the side, front and rear walls 35–38 have padding 76 thereon so that a child cannot be injured thereby. Similarly a leg and back panel 55 and 62 are provided with cushions 77 and 78 thereon which are held rigidly and securely in place by a suitable covering 80 (FIG. 6) which surrounds the cushions as well as the panels. A seat cushion 82 is provided between the panels 55 and 62 on the central section 53 of the bottom wall 50 to provide a soft surface for the child to sit. When seated, the legs of the child extend along with the downwardly sloped leg panel 55 whereas the back rests against the back cushion 78 on the back panel 62.

When it is desired that the child sleep or relax, it is merely necessary to move the leg panel 55 upwardly to the position shown in FIG. 6 and rotate the fastening member 56 to hold this panel in a horizontal plane. Likewise, the cord 65 is removed from the loops 66 to allow the back panel 62 to move rearwardly and downwardly to the position shown in FIG. 6 wherein the rear edge 85 thereof rests on an edge 86 of the bottom wall 50 thereby positioning the back panel 62 in a horizontal position. The seat cushion 82 can be slightly adjusted to relieve any large spaces between the seat and back cushions 82 and 78 and thus a relatively flat comfortable sleeping surface is provided for the child. To rearrange the device in its seating position, it is merely necessary to reverse the operation recited above. A seat belt 86 may be provided to hold the child in the seat bed in either the seated or sleeping position.

Accordingly, applicant has provided a seat bed which is adapted to use the heretofore wasted space above the motor housing in the station bus. The seat bed is relatively simple and easy and thus inexpensive to manufacture, and it is easily converted between the bed and seat position and vice versa. Furthermore, it can be easily removed from the vehicle by merely loosening one clamp member.

While the invention has been described primarily as a child's seat bed, it is within the scope of the invention to modify the device to provide an auxiliary carrier or working surface for use with a station bus. Likewise, the seat bed can be modified in many respects without departing from the invention, and it is possible to construct the device as either a bed or a seat without the convertibility described above.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. An auxiliary seat bed adapted for use in a station bus having a motor housing between the front seats with a horizontal flange surrounding the sides of the motor housing, comprising a rectangular frame, support legs extending downwardly from central portions of the opposite sides of said frame for engagement with said horizontal flange, means securing the rear portion of said frame to the motor housing, a bottom wall in said frame having a central section, and a leg panel pivotally secured adjacent the forward edge of said central section, said leg panel being disposed forwardly of the front of the motor housing and adapted to pivot downwardly to accommodate the legs of a person sitting on said central section, said bottom wall also having a back panel secured thereto to pivot upwardly adjacent the rear edge of said central section to support the back of a person sitting on said central section, said leg and back panels adapted to be moved to a retracted position wherein they cooperate with said central section to provide a flat bed surface.

2. An auxiliary seat device adapted for use in a station bus having a motor housing between the front seats with a horizontal flange surrounding the sides of the motor housing, comprising a rectangular frame, support legs extending downwardly from central portions of the opposite sides of said frame for engagement with said horizontal flange, means securing said frame to the motor housing, a bottom wall in said frame having a central section, and a leg panel pivotally secured adjacent the forward edge of said central section, said leg panel being disposed forwardly of the front of the motor housing and extending downwardly to accommodate the legs of a person sitting on said central section, said bottom wall also having a back panel secured thereto and extending upwardly adjacent the rear edge of said central section to support the back of a person sitting on said central section.

3. An auxiliary seat bed adapted for use in a station bus having a motor housing adjacent the driver's seat, comprising frame means, support means on said frame means to mount said frame means on the motor housing, means securing said frame means to the motor housing, a bottom wall in said frame means having a central section, and a leg panel pivotally secured adjacent the forward edge of said central section, said leg panel projecting forwardly of the front of the motor housing and adapted to pivot downwardly to accommodate the legs of a person sitting on said central section, said bottom wall also having a back panel adapted to pivot upwardly from adjacent the rear edge of said central section to support the back of a person sitting on said central section, said leg and back panels adapted to be moved to a retracted position wherein they cooperate with said central section to provide a flat bed surface.

4. An auxiliary seat bed as defined in claim 3 wherein adjustment means is provided for adjustably positioning said back panel in any of a plurality of positions.

5. An auxiliary seat bed as defined in claim 4 wherein said adjustment means includes a flexible cord secured to said frame forwardly of said back panel and extending upwardly to adjustable connections with the top portion of said seat panel.

6. An auxiliary seat bed adapted for use in a station bus having a motor housing adjacent the driver's seat, comprising frame means, support means on said frame means to mount said frame means on the motor housing, means securing said frame means to the motor housing, a bottom wall in said frame means having a central section, and a leg panel pivotally secured adjacent the forward edge of said central section, said leg panel projecting forwardly of the front of the motor housing and downwardly from the frame means to accommodate the legs of a person sitting on said central section, said frame means also having a back panel adapted to pivot upwardly from said bottom wall to support the back of a person sitting on said central section.

References Cited

UNITED STATES PATENTS

| | | | |
|---|---|---|---|
| 2,436,294 | 2/1948 | Glatstein | 297—118 X |
| 2,575,953 | 11/1951 | Haley et al. | 296—65 X |
| 2,966,201 | 12/1960 | Strahler | 5—94 X |
| 3,065,023 | 11/1962 | Spound | 297—423 X |

DAVID J. WILLIAMOWSKY, *Primary Examiner.*

FRANK B. SHERRY, *Examiner.*

R. D. KRAUS, *Assistant Examiner.*